June 18, 1946.   H. W. ROCKWELL   2,402,449
HYDRAULIC SYSTEM
Filed Aug. 9, 1943   2 Sheets-Sheet 1
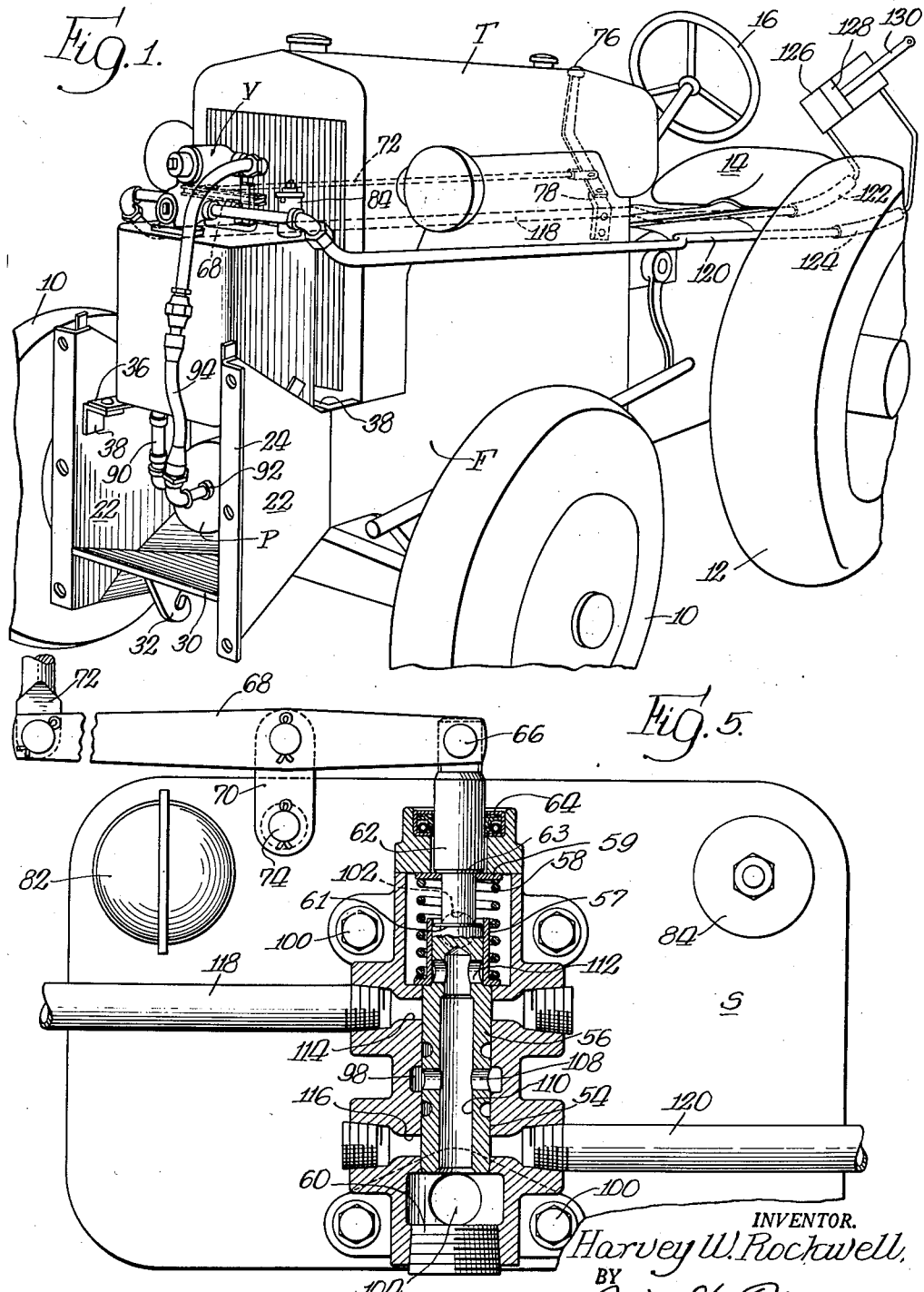
INVENTOR.
Harvey W. Rockwell,
BY
Bair & Freeman
Attys.

June 18, 1946.   H. W. ROCKWELL   2,402,449
HYDRAULIC SYSTEM
Filed Aug. 9, 1943   2 Sheets-Sheet 2
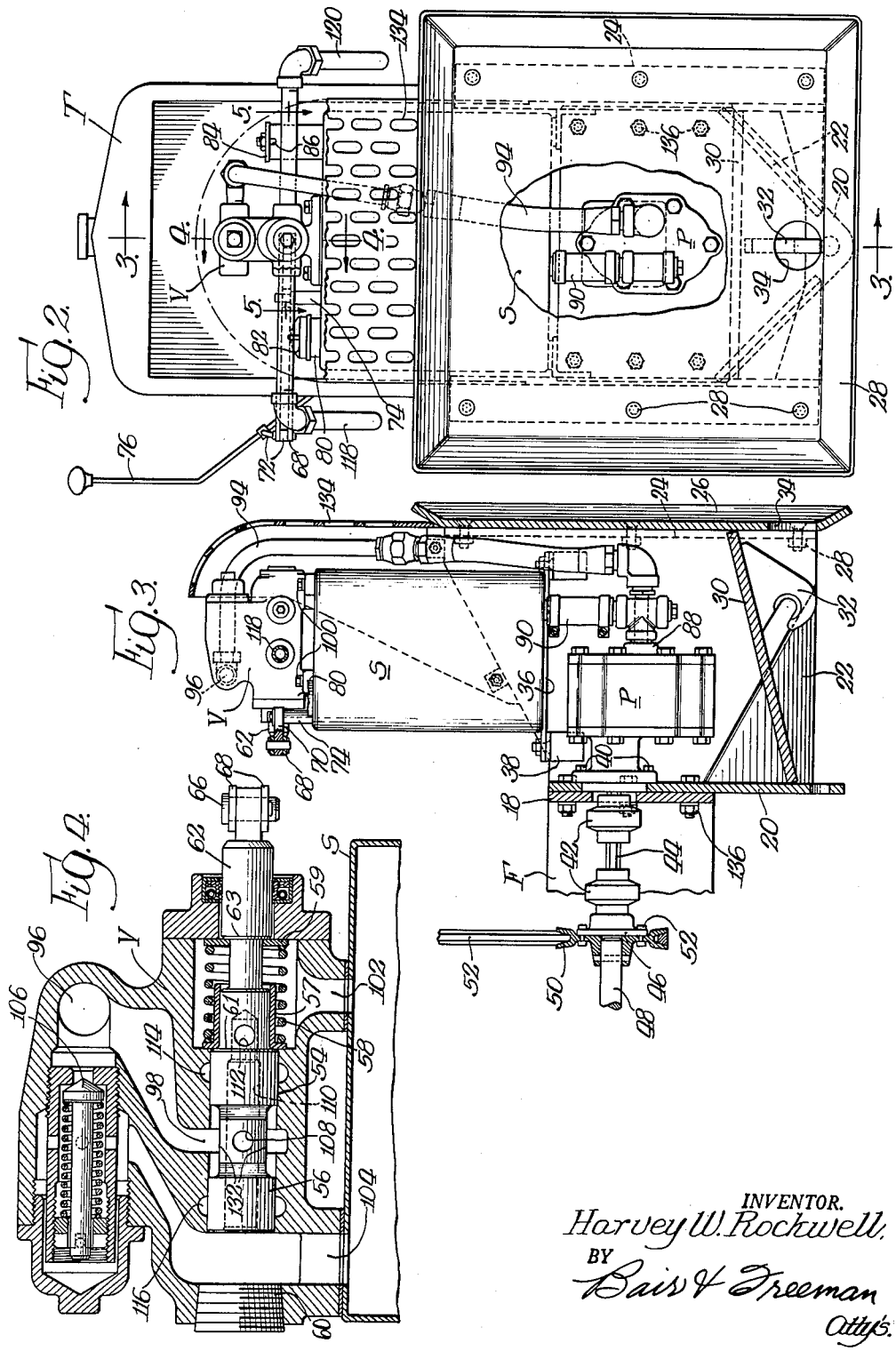
INVENTOR.
Harvey W. Rockwell,
BY
Bair & Freeman
Attys.

Patented June 18, 1946

2,402,449

UNITED STATES PATENT OFFICE 2,402,449

HYDRAULIC SYSTEM

Harvey W. Rockwell, Cedar Rapids, Iowa, assignor to Laplant-Choate Manufacturing Co., Inc., Cedar Rapids, Iowa, a corporation of Iowa Application August 9, 1943, Serial No. 497,937

7 Claims. (Cl. 180—1)

My present invention relates to a hydraulic system, particularly adapted for ready attachment and removal with relation to a light tractor of the wheeled type, such tractor being adapted for pulling earth moving equipment, such as scrapers and the like having hydraulically operated mechanism, the hydraulic system being suitably connected therewith for control of the mechanism from the driver's seat of the tractor.

One object of the invention is to provide a pump, oil tank and valve assembly in the form of a unit attachable to the front of the tractor, the unit also including a push plate and a pull hook for operative engagement or connection of the tractor with earth moving equipment when necessary without removal of the hydraulic unit.

Another object is to provide a unit of this character which is simple and inexpensive to manufacture, all of the parts being assembled and supported with respect to a pump housing which housing is readily attachable or detachable with relation to the front of the tractor frame.

Still another object is to provide a U-shaped plate attachable to the tractor frame and supporting a pump and oil tank, a push plate being also supported on the U-shaped plate in position to protect the pump and oil tank, and an oil control valve being supported on top of the oil tank for connection with oil supply pipes that may run along opposite sides of the tractor to the rear thereof where they are connected with a hydraulically operated device towed by the tractor.

A further object is to provide a control lever for the oil flow control valve which may be mounted adjacent the driver's seat at the back of the tractor and connected as by a link with the valve.

Still a further object is to provide a unit including a pump which is supported in such position that it is readily adapted for operative connection with the engine of the tractor.

With these and other objects in view, my invention consists in the construction, arrangement and combination of the various parts of my device whereby the objects contemplated are attained, as hereinafter more fully set forth, pointed out in my claims, and illustrated in the accompanying drawings, wherein:

Figure 1 is a perspective view of a tractor with my hydraulic system unit mounted thereon, the push plate of the unit being removed to more clearly show the construction of the unit.

Figure 2 is an enlarged front elevation of the unit on the tractor, parts of the unit being broken away to illustrate details.

Figure 3 is a vertical sectional view on the line 3—3 of Figure 2.

Figure 4 is an enlarged sectional view on the line 4—4 of Figure 2 showing details of the valve structure, and;

Figure 5 is an enlarged sectional view on the line 5—5 of Figure 2 showing a plan view of the oil tank and further details of the oil flow control valve.

On the accompanying drawings I have used the reference character T to indicate generally a tractor, the wheels thereof being indicated at 10 and 12, the driver's seat at 14 and the steering wheel at 16. The tractor T has a frame F provided with a cross-piece 18 at the front, and to this cross-piece I secure my hydraulic system unit as will hereinafter appear.

My hydraulic system unit includes as its main elements a pump P, an oil storage tank S, and an oil flow control valve V. A housing is provided for the pump P comprising a plate having a cross-piece which is indicated at 20 and two sides indicated at 22. The sides 22 terminate in flanges 24 with which a push plate 26 is connected as by bolts 28. A bottom plate 30 is provided between the plate elements 20 and 22 and the push plate 26, and mounted on the under surface thereof is a pull hook 32. The push plate 26 is provided with a large opening 34 through which a chain may extend for engagement with the hook 32 when it is desired to pull an object by reverse movement of the tractor. The plate elements 20 and 22 and the plates 26 and 30 form a five-sided housing for the pump P, such housing having an open top. The plate elements 20 and 22 and the plates 26 and 30 may be readily assembled as by welding in a well known manner.

Substantially closing the open top of the housing is the oil storage tank S which is supported by a pair of bars 36 welded to the bottom of the tank S and bolted to brackets 38. The brackets 38 may be welded to the side plates 22 of the pump housing. The pump P is supported on the cross-piece 20 as by bolts 40 and its shaft is connected through drive couplings 42, a telescoping shaft 44, and a coupling flange 46 with the shaft 48 of the tractor engine. Usually this shaft has a pulley 50 on its forward end and the flange 46 may be attached thereto as by bolts 52. The pulley 50 is for the fan belt 52 of the tractor.

The valve V consists of a body having therein a bore 54 closed at one end by a plug 60. A valve plunger 56 is reciprocable in the bore and normally retained in the central or neutral position shown in Figure 5 by a spring 58 interposed between a flanged sleeve 57 and a washer 59. The valve plunger has shoulders 61 and 63 for engaging the elements 57 and 59 respectively and a stem 62 extending through a packing 64 to the exterior of the valve body. The stem 62 is pivoted at 66 to a lever 68. The lever 68 may in fact be two levers for straddling the valve stem 62 and links 70 and 72. The link 70 is pivoted at 74 to the top of the tank S while the link 72 extends rearwardly along the side of the tractor and is pivoted to a hand lever 76. The lever 76 in turn is pivoted to a bracket 78 suitably connected with the tractor T or some portion of the engine or frame of the tractor. The lever 76 is adjacent the driver's seat 14 for convenience in operating the valve V at the front of the tractor.

The tank S has a filler tube 80 and a filler cap 82 mounted on the top thereof. A breather tube 84 is provided, and it may be filled with a suitable oiled copper wool or the like to minimize infiltration of dust to the oil in the tank S. The breather tube 84 has an opening 86 to permit air to breathe in and out of the tank S as the oil level is lowered or raised therein.

The pump P has an intake 88 to which a conduit 90 is connected, such conduit leading from the bottom of the oil storage tank S. The pump also has an outlet 92 which is connected by piping 94 with an inlet 96 of the valve V. The inlet 96 communicates with an inlet port 98 of the valve. The valve is mounted on the top of the tank S by means of cap screws or bolts 100, with suitable gaskets between the valve and the tank to prevent leakage. The bolts 100 extend through flanges of the valve which flanges are perforated as at 102 and 104 with valve return ports.

Between the inlet 96 and the outlet port 94 a relief valve 106 is provided which relieves excess pressure in case of an emergency. Normally when the valve is in the neutral position shown in Figures 4 and 5 the oil being pumped continuously into inlet 96 passes through the port 98 and then through openings 108 in the valve plunger 56 to enter the bore 110 of the plunger. In the bore the oil divides, part of it going to the return port 104 and part of it going through openings 112 and the return port 102 back into the tank S.

The valve V is also provided with outlet ports 114 and 116 communicating with oil supply pipes 118 and 120 respectively. The supply pipes 118 and 120 extend along opposite sides of the tractor and terminate in flexible hoses, 122 and 124 at the rear of the tractor. There they are adapted to be connected with a hydraulic operating mechanism of a device such as a scraper towed by the tractor. The hydraulic mechanism, as shown diagrammatically in Figure 1, has a cylinder 126, a piston 128 and a piston rod 130. This mechanism may be for the purpose of raising and lowering or dumping the scraper bucket, which however is no part of my present invention, and accordingly not illustrated.

As to operation of the valve V, it is shown in the neutral position in Figure 5, the spring 58 normally retaining it in this position. The lever 76 may be pushed forwardly for supplying oil to the pipe 118 and thereby extending the piston rod 130; or may be pulled rearwardly for effecting a withdrawal of the piston rod as desired. When the lever 76 is pushed forwardly, the valve plunger 56 moves upwardly in Figure 5 or toward the right in Figure 4, thus permitting connection of the supply port 98 with the outlet port 114 across flats 132 of the valve plunger 56. At the same time the outlet port 116 acts as a return port for the pipe 120 as the left hand end of the valve plunger in Figure 4 is then past the port 116, permitting it to communicate directly with the return port 104. When the valve control lever 76 is reversed in direction, the ports 98 and 116 are connected with each other and the ports 114 and 102 are connected with each other in an obviously similar manner.

It will be noted that the storage tank S extends upwardly above the push plate 26. For protecting this part of the storage tank and also the pipe 94 and the valve V, I provide a guard 134. This guard is preferably perforated so as to minimize interference with the stream of cooling air passing to and through the radiator of the tractor. The guard 134 is welded or otherwise suitably secured to the push plate 26.

It will be obvious from the foregoing description of my invention that a unitary structure has been provided which may be readily attached or detached relative to the frame F. Six bolts 136 are provided for this purpose and they are readily accessible from the inside of the frame F and from within the pump housing for removal or insertion. When the hydraulic unit is placed in position, the shaft 44 telescopes into the coupling 42 for providing an operative connection between the tractor engine and the pump P. The couplings 42 permit slight misalignment without binding in the operation of the pump from the engine. My hydraulic system may be readily attached or detached relative to the tractor frame, and when in attached position does not interfere with ordinary pushing and pulling operations by the tractor because of my provision of the push plate 26 and the pull hook 32. The push plate at the same time forms a front for the pump housing and a protection for both the pump and the storage tank. By mounting the pump, storage tank and valve in the manner disclosed, relatively short connections between them may be provided and these connections are readily accessible for replacement or repair by merely removing the push plate from its bolted-on position. When the push plate is removed as shown in Figure 1 then the pump P is readily accessible.

My structure provides a unit which may be readily mounted on a tractor and then connected with the hydraulic mechanism of a device such as a scraper towed by the tractor. I have shown one arrangement which has proven satisfactory and this arrangement may be somewhat changed without departing from the real spirit and purpose of my invention, and it is therefore my intention to cover by my claims any modified forms of structure, or use of mechanical equivalents, which may be reasonably included within their scope.

I claim as my invention:

1. In an attachment for a tractor, a pump housing having one side provided with means for attaching it to the front of the tractor, a pump housed in said housing and provided with means for operatively connecting it with the tractor engine, an oil tank mounted above said pump and carried by said housing, an oil control valve surmounting said tank, a supply line connected with said valve, and valve operating linkage having a link and a lever, said lever being provided with means for pivotally mounting it adjacent the driver's seat of the tractor and said link extending from said valve at the front of the tractor to said lever.

2. In an attachment for a tractor, a pump housing having one side provided with means for attaching it to the front of the tractor, a pump housed in said housing and provided with means for operatively connecting it with the tractor engine, an oil tank mounted above said pump and carried by said housing, an oil control valve surmounting said tank, and oil supply lines connected with said valve and extending along opposite sides of the tractor for direct and unobstructed connection to a hydraulic mechanism rearwardly of the tractor.

3. In an attachment for a tractor, a pump housing having one side provided with means for attaching it to the tractor, a pump housed in said housing and provided with means for operatively connecting it with the tractor engine, an oil tank carried by said housing, an oil control valve surmounting said tank and having a direct return into said tank, and means for positioning said control valve, said means being provided with a bracket for attachment to the tractor adjacent the driver's seat thereof, said means having a remote control connection extending to said control valve.

4. In an attachment of the character disclosed for a tractor, a pump housing having one side provided with means for attaching it to the front of a tractor, a pump housed in said housing and provided with means for operatively connecting it with the tractor engine, an oil tank mounted on and carried by said housing, an oil control valve surmounting said tank, an oil supply line connected with said valve, and valve operating linkage having a control portion provided with means for mounting it adjacent the driver's seat of the tractor and having a connecting portion extending from said control portion to said oil control valve.

5. An attachment of the character disclosed comprising a unit provided with means for detachably connecting it with a tractor, said unit including a U-shaped plate having its cross-piece provided with means for attachment to the front of the tractor, an oil pump supported on said cross-piece and having means adapted for operatively connecting it with the tractor engine, a front plate spanning the front of said U-shaped plate, a bottom plate for said U-shaped plate and said front plate, an oil tank supported between the sides of said U-shaped plate and protected from contact with objects by said front plate, an oil flow control valve mounted on the top of said tank, an intake conduit from the bottom of said tank to said pump, an outlet conduit connecting the outlet of said pump with said valve and extending between said front plate and said tank, supply conduits from and to said valve and provided with means for connecting them with a hydraulically operated device pulled by said tractor, and operating mechanism for said valve including a lever provided with means for positioning it adjacent the driver's seat.

6. An attachment of the character disclosed comprising a unit provided with means for detachably mounting it on a tractor, said unit including a U-shaped plate having its cross-piece provided with means for attaching it to the front of a tractor frame, an oil pump supported on said cross-piece and provided with means for operatively connecting it with the tractor engine, an oil tank supported between the sides of said U-shaped plate, an oil flow control valve mounted on the top of said tank and having a return directly into the tank, an intake conduit from the bottom of said tank to said pump, an outlet conduit connecting the outlet of said pump with said valve, and supply conduits from said valve and having means for connecting them with a hydraulically operated device.

7. An attachment of the character disclosed comprising a unit provided with means for detachably mounting it on a tractor, said unit including a U-shaped plate having its cross-piece provided with means for attachment to the front of the tractor, an oil pump supported on said cross-piece and provided with means to operatively connect it with the tractor engine, an oil tank supported between the sides of said U-shaped plate, an oil flow control valve mounted on said oil tank, and a conduit from said valve provided with means to connect it with a hydraulically operated device.

HARVEY W. ROCKWELL.